June 3, 1969 C. W. H. BARNETT 3,448,437

CERAMIC MEMORY DEVICE

Filed Dec. 22, 1965

INVENTOR
CHARLES W. H. BARNETT

BY Harry M. Saragovitz, Edward J. Kelly, Herbert Berl & J. D. Edgerton ATTORNEYS United States Patent Office 3,448,437

Patented June 3, 1969

3,448,437
CERAMIC MEMORY DEVICE

Charles W. H. Barnett, Alexandria, Va., assignor to the United States of America as represented by the Secretary of the Army Filed Dec. 22, 1965, Ser. No. 515,703
Int. Cl. G11b 5/44
U.S. Cl. 340—173.2 5 Claims

ABSTRACT OF THE DISCLOSURE

A piezoelectric ceramic memory unit which has separate write-in and read-out electrodes and which does not utilize switches. A signal is stored in the ceramic body by applying a D.C. potential to a preselected area of the body which is preferably in the form of a disc. Through remnant polarization, the binary state of the pre-selected area may be established and stored indefinitely and later detected from the read-out electrodes.

The invention described herein may be used by or for the Government of the United States for governmental purposes without the payment to me of any royalty thereon.

This invention relates to a ceramic memory device for storing digital information, and more particularly to a piezoelectric ceramic memory having separate and independent write-in and read-out electrodes, which makes it possible to isolate the memory write-in and read-out circuits without any switches.

As is well known, the piezoelectric effect is the property of certain bodies of generating electrical charge when subjected to a mechanical stress, and, conversely, becoming mechanically stressed when subjected to an electrical potential. Perhaps the best known piezoelectrics are the Rochelle salts and quartz crystals commonly used in accelerometers, for controlling oscillators, in microphones, and for a variety of other purposes.

In addition to the piezoelectric crystals and salts, there has more recently been developed a family of materials referred to as the "piezoelectric ceramic" materials, which exhibit piezoelectric properties to varying degrees depending upon the amount of polarization. That is, the piezoelectric properties of these materials can be varied and controlled by a polarizing potential. Unquestionably, the most prominent of the piezoelectric ceramics are those formed of barium titanate and lead zirconium titanate. In the ceramic piezoelectrics, the piezoelectric properties are proportional to the remnant polarization resulting from the relatively large D.C. potentials to which the materials are initially subjected in order to produce the desired piezoelectric properties.

Within the last approximately five to ten years, it has been found that the piezoelectric effect can be used to produce a small and relatively economical solid-state memory for use in digital computers or wherever it is desirable to store digital information. However, insofar as applicant is aware, none of these devices provide for effective isolation between the input and output circuits, and for proper operation require extensive and complex switching arrangements to provide independence between the input (i.e., write-in) and output (i.e., read-out) circuits of the storage unit in which they are provided.

The present invention avoids the above-mentioned difficulties by providing a novel piezoelectric ceramic memory unit having sepaarte write-in and read-out electrodes, which electrodes provide effective isolation between the write-in and read-out circuits. The unit thus provides a relatively simple and inexpensive storage device in which no complex additional switching equipment is required for proper operation, nor must the device be programmed in order to provide signal input and output circuit compatibilty.

In the present invention, signal storage is obtained by applying a relatively large D.C. potential to a pre-selected area of a ceramic body, preferably in the form of a small, circular disc. This pre-selected area is preferably radially spaced from a central driver area of the disc, the latter being pre-polarized and coupled to an A.C. signal source such that the driver area acts as a motor to oscillate the disc. Through remnant polarization, the binary state of the pre-selected area may be established and stored indefinitely and later detected (i.e, read-out) from separate electrodes located at or adjacent the aforementioned pre-selected storage area and coupled thereto. In this way, the relatively-high-voltage D.C. input or write-in circuit (i.e., 100 to 400 volt) is simply and effectively isolated from the output or read-out circuit, which preferably is a low-voltage (i.e., 0 to 20 volt) transistorized A.C. circuit operating preferably at the resonant frequency of the disc anywhere in the neighborhood of from a few kilocycles to several hundred kilocycles (i.e., 50 to 500 kc.).

It is therefore one object of the present invention to provide an improved memory device.

Another object of the present invention is to provide an improved ceramic memory.

Another object of the present invention is to provide an improved piezoelectric memory element having separate input and output electrodes.

Another object of the present invention is to provide an improved ceramic piezoelectric memory device having isolated write-in and read-out circuits and without switches.

These and further objects and advantages of the invention will be more apparent upon reference to the following specification, claims and appended drawings, wherein:

Figure 1:
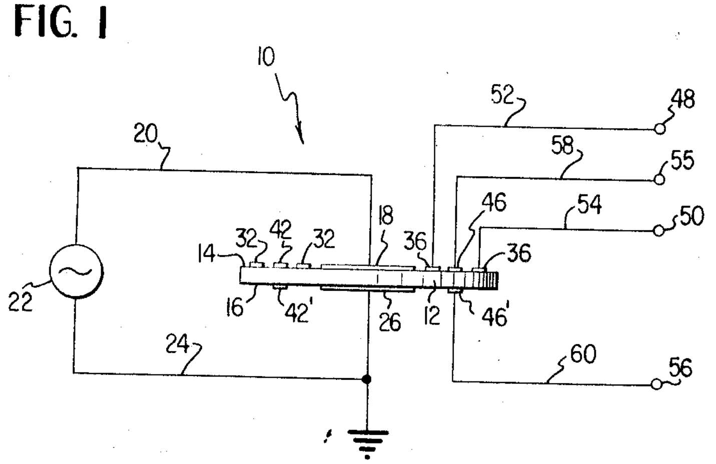
FIGURE 1 is a side view of the novel memory device of the present invention and its associated circuitry.
Figure 2:
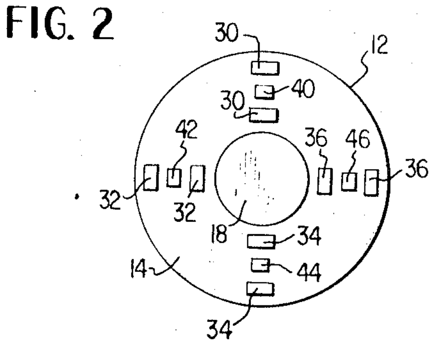
FIGURE 2 is a top plan view of the wafer or disc of FIGURE 1.
Figure 3:
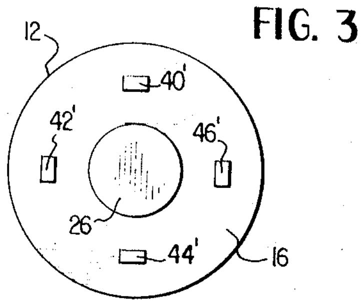
FIGURE 3 is a bottom plan view of the disc of FIGURE 1.

Referring to the drawings, the storage device of the present invention, generally indicated at 10 in FIGURE 1, comprises a circular wafer or disc 12 of piezoelectric ceramic material such as barium titanate. The disc is provided with a flat upper or top surface 14 and a similar opposed or under surface 16. Suitably secured to a center portion of upper surface 12 is a first flat, circular drive electrode 18 connected by way of lead 20 to one output terminal of a radio frequency oscillator 22. The other output terminal of the oscillator 22 is connected by a lead 24 to ground and to a similar second flat, circular drive electrode 26 formed on the under surface 16 of the disc. Drive electrodes 18 and 26 are concentric with a perpendicular axis passing through the center of disc 12, and cover a sufficient area of the disc such that when energized from oscillator 22, the entire disc 12 oscillates at its natural frequency. That is, the RF potential developed across electrodes 18 and 22 mechanically stresses the disc such that it vibrates at the frequency of oscillator 22, which is preferably adjusted to the natural resonant frequency of the mechanical assembly.

Also suitably secured to upper surface 14 of the disc are four pairs of input or write-in electrodes 30, 32, 34 and 36. Each pair of write-in electrodes is spaced 90 degrees about the surface of the disc, and the individual electrodes of each write-in pair are preferably aligned along radial lines passing through the center of the upper disc surface. The outer electrodes of each pair are preferably at equal distances from the center of the disc, as are the inner electrodes of each write-in pair. Also attached to upper disc surface 14 are four read-out electrodes 40, 42, 44 and 46, which electrodes cooperate with corresponding electrodes 40′, 42′, 44′ and 46′, secured to the undersurface 16 of the disc, to form four read-out pairs of electrodes for the memory device. The upper read-out electrodes are preferably spaced at equal distances between the corresponding pairs of write-in electrodes; for example, read-out electrode 40 is spaced equidistant between write-in electrodes 30. In addition, the read-out electrodes are preferably along the same radial lines as the write-in electrodes with which they cooperate.

As illustrated in FIGURE 1, write-in electrodes 36 are connected to a pair of write-in terminals 48 and 50 by way of leads 52 and 54. Read-out electrodes 46 and 46′ are connected to read-out terminals 55 and 56 by way of leads 58 and 60. The remaining electrodes are connected to appropriate write-in and read-out terminals (not shown) in a similar manner. If desired, one side of all the read-out circuits may be connected in common such as by connecting all of the read-out electrodes on the upper surface of the disc to ground.

Figure 4:
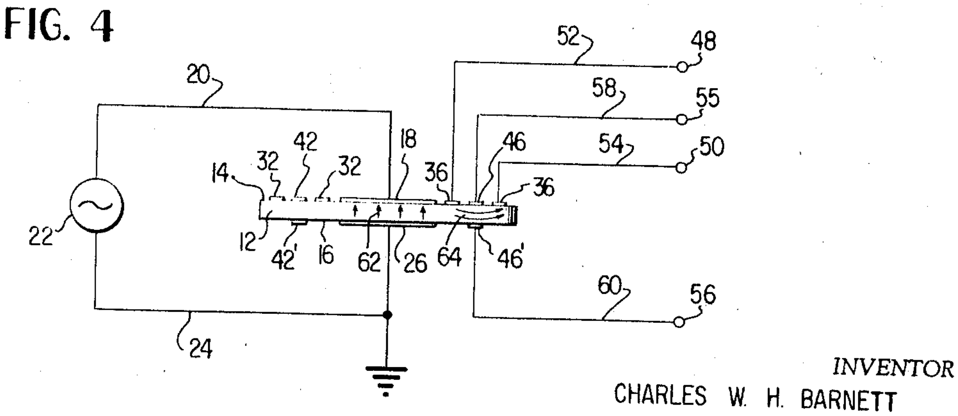
FIGURE 4 is an outline diagram of the ceramic piezoelectric memory device of FIGURES 1–3 showing the locations of the permanent polarization for motor action and the write-in control polarization for information storage.

In operation, the central area of the disc between drive electrodes 18 and 26 is first pre-polarized to provide a driver area for the disc. That is, the electrodes 18 and 26 are first connected to a large D.C. potential source (not shown) such that the area between these electrodes is given a permanent polarization as indicated by the small arrows at 62 in FIGURE 4. Driver polarization potentials for present-day ceramic materials are on the order of 120 volts per mil, so that for a disc 10 mils thick the driver area is subjected to a pre-polarizing potential of about 1200 volts D.C. These electrodes are then connected to the RF generator 22 which oscillates the disc 12 through a motor action at its resonant frequency, anywhere in the neighborhood of from many kilocycles to many hundreds of kilocycles, depending upon the size of the disc. Digital information is stored in the disc by coupling the write-in terminals 48 and 50 (and corresponding terminals of the other write-in electrodes) to a source of relatively high D.C. voltage, such that an area of the disc between the write-in electrodes becomes polarized in the manner illustrated by the arrows 64 in FIGURE 4. With the area between the write-in electrodes 36 so polarized, oscillation of the disc under the influence of the RF drive source 22 results in an A.C. voltage appearing across read-out terminals 55 and 56, which voltage is indicative of the polarized state of the information or storage area common to the write-in electrodes 36 and the read-out electrodes 46 and 46′.

The write-in operation is performed by applying a high-voltage D.C. of known polarity (100 to 400 volt) across the write-in terminals. In this condition there is an output voltage produced across the read-out terminals by the motor action of the driver. This condition may correspond to "one" in a binary system. The polarity of the high voltage across the write-in terminals 48 and 50 may be reversed and the voltage reduced, causing a partial destruction of the remnant polarization between wirte-in electrodes 36. This causes the output at read-out terminals 55 and 56 to become lower, and may correspond to the condition "zero" of a binary system.

An important feature of the storage devices of this invention is that, because of remnant polarization, the unit will retain the stored information for a substantial period of time, even in the no-power condition. Other methods of producing the binary "zero" state may be used, such as heating the ceramic wafer or disc above its Curie point or applying an A.C. potential to write-in electrodes 48 and 50 of decreasing amplitude. In addition, the write-in and read-out electrodes can be exchanged or interchanged in operation, so that terminals 48 and 50 become the read-out terminals and terminals 55 and 56 become the write-in terminals. This can produce a voltage increase; i.e., a transformer action. In addition, two or more discs can be stacked together and operated from a single motor.

The piezoelectric ceramic memory device of this invention will store information while the device is either in operation or out of operation and retain the stored information for a substantial period of time in the no-power condition. The write-in and read-out circuits are completely isolated from each other and no switching is necessary in the system. The essential feature is that the write-in electrodes be separate and electrically isolated from the read-out electrodes and that the two pairs of electrodes be piezoelectrically coupled or have an area of controllable polarization in common such that the write-in electrodes influence the condition under which the read-out electrodes operate. While the preferred construction is shown and described, this essential feature can be accomplished with several different configurations of electrode geometry consistent with the fact that the voltage along the radius of the device will vary with the distance from its center and that this voltage will be different for fundamental resonant frequency, first and second harmonics. The unit will work just as well when the read-out electrodes are not placed directly opposite each other, since with high dielectric materials the resulting voltage divider action does not adversely affect the operation of the device.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency are therefore intended to be embraced therein.

What is claimed and desired to be secured by United States Letters Patent is:

1. An electrical signal storage device comprising a body in the form of a disc exhibiting piezoelectric properties indicative of an applied polarizing potential, said body having a pair of drive electrodes connected to opposite sides of said disc at its center, a plurality of spaced write-in electrodes defining a plurality of signal storage areas, and a plurality of read-out electrode pairs coupled to a respective one of said areas for producing an electrical output signal when said area is mechanically stressed indicative of the condition of palarization of said area.

2. An electrical signal storage device comprising a body in the form of a flat, circular disc of piezoelectric ceramic material which exhibits properties indicative of an applied polarizing potential, said body having a pair of drive electrodes connected to opposite sides of said disc at its center, write-in electrodes including a plurality of pairs of electrodes on said disc defining signal storage areas, said areas being spaced equidistant from the center of said disc and at equal angles about said disc adjacent its periphery, and read-out electrodes including a plurality of pairs of separate electrodes, each read-out pair being coupled to a respective one of said areas for producing an output signal indicative of the state of polarization of said area.

3. A device according to claim 2 wherein said write-in electrodes are all on one side of said disc, and said read-out electrode pairs each have one electrode on each side of said disc.

4. A device according to claim 3 wherein the two electrodes of each write-in pair are on a common radial line passing through the central axis of said disc, and an electrode of the corresponding read-out pair is intermediate said two write-in electrodes.

5. A device according to claim 2 including a radio-frequency source coupled to said drive electrodes, and means for coupling said write-in and read-out electrodes to separate write-in and read-out circuits respectively.

References Cited

UNITED STATES PATENTS

| | | | |
|---|---|---|---|
| 3,042,904 | 7/1962 | Brennemann et al. | 340—173.2 |
| 3,246,164 | 4/1966 | Richmond | 310—8.1 X |
| 3,253,166 | 5/1966 | Osial et al. | 310—8.1 X |
| 3,264,618 | 8/1966 | Wanlass et al. | 340—173.2 |
| 3,286,205 | 11/1966 | Ballato | 333—30 |
| 3,104,377 | 9/1963 | Alexander et al. | 340—173.2 |

BERNARD KONICK, *Primary Examiner.*

JOSEPH F. BREIMAYER, *Assistant Examiner.*

U.S. Cl. X.R.

310—8.1, 9.8